(12) United States Patent
Townsend (10) Patent No.: US 12,077,286 B2
(45) Date of Patent: Sep. 3, 2024

(54) WINGED DRONE WITH ADJUSTABLE CENTER OF GRAVITY FOR CARRYING A PAYLOAD

(71) Applicant: Matthew W. Townsend, Fort Worth, TX (US)

(72) Inventor: Matthew W. Townsend, Fort Worth, TX (US)

( * ) Notice: Subject to any disclaimer, the term of this patent is extended or adjusted under 35 U.S.C. 154(b) by 271 days.

(21) Appl. No.: 17/652,705

(22) Filed: Feb. 28, 2022

(65) Prior Publication Data

US 2023/0271700 A1 Aug. 31, 2023

(51) Int. Cl.
| | |
|---|---|
| B64C 29/02 | (2006.01) |
| B64C 3/40 | (2006.01) |
| B64C 17/02 | (2006.01) |
| B64U 10/25 | (2023.01) |
| B64U 40/20 | (2023.01) |
| B64U 30/12 | (2023.01) |
| B64U 101/60 | (2023.01) |

(52) U.S. Cl.
CPC .............. B64C 29/02 (2013.01); B64C 3/40 (2013.01); B64C 17/02 (2013.01); B64U 40/20 (2023.01); B64U 10/25 (2023.01); B64U 30/12 (2023.01); B64U 2101/60 (2023.01)

(58) Field of Classification Search
CPC .......... B64U 30/12; B64U 40/20; B64C 3/40; B64C 17/02; B64C 29/02
See application file for complete search history.

(56) References Cited

U.S. PATENT DOCUMENTS

| | | | |
|---|---|---|---|
| 9,550,567 B1 | 1/2017 | Erdozain, Jr. et al. | |
| 2015/0284079 A1* | 10/2015 | Matsuda | B64C 39/024 |
| | | | 244/7 A |
| 2017/0008625 A1* | 1/2017 | Olm | B64C 3/56 |
| 2018/0178899 A1 | 6/2018 | Har et al. | |
| 2018/0312251 A1* | 11/2018 | Petrov | B64C 27/28 |
| 2019/0322366 A1 | 10/2019 | Gaffney et al. | |
| 2019/0322368 A1 | 10/2019 | Melcher | |
| 2020/0094961 A1 | 3/2020 | Kimchi et al. | |
| 2020/0324885 A1 | 10/2020 | Bernard | |
| 2021/0031913 A1 | 2/2021 | Martel | |
| 2022/0324561 A1* | 10/2022 | Abbott | B64C 3/14 |

* cited by examiner

Primary Examiner — Nicholas McFall
(74) Attorney, Agent, or Firm — Sheri Higgins; Sheri Higgins Law, PLLC (57) ABSTRACT

A drone can be used to carry a payload. The drone can include at least two wings extending from a fuselage and propellers that allow the drone to fly in a horizontal orientation. The drone can takeoff and land from a vertical orientation via landing rods at the rear of the fuselage. The drone also includes an adjustable center of gravity and/or an adjustable center of lift. The center of gravity can be adjusted by changing the weight of payload located fore and aft of the center of gravity or moving at least a portion of the payload fore or aft along the fuselage. The center of lift can be adjusted by swinging the wings away from or towards the fuselage or sliding the wings fore or aft along the fuselage such that the center of lift is adjacent to the center of gravity.

19 Claims, 7 Drawing Sheets

WINGED DRONE WITH ADJUSTABLE CENTER OF GRAVITY FOR CARRYING A PAYLOAD

TECHNICAL FIELD

A drone includes wings for allowing the drone to fly in a horizontal position and can take off and land in a vertical position. The drone can include a variety of components that adjust the center of gravity along a fuselage of the drone such that the drone is capable of flying in the horizontal position. The drone can carry a payload on a bottom of the fuselage.

BRIEF DESCRIPTION OF THE FIGURES

The features and advantages of certain embodiments will be more readily appreciated when considered in conjunction with the accompanying figures. The figures are not to be construed as limiting any of the preferred embodiments.

DETAILED DESCRIPTION

Drones are used for a variety of applications. For example, drones can be used to carry instruments, such as, cameras, weather equipment, survey equipment, fire surveillance equipment, and water or other fire control materials. By way of another example, drones can be used to deliver packages. The usage of drones has only increased in recent years—due in part to the lightweight nature of drones, the ability to remotely control a drone, which reduces the risk to operators, and the energy savings compared to vehicles or planes.

Drones typically include one or more propellers and motors built into a central frame. Drones are oftentimes designed to take off and land in a vertical position with respect to a plane of the Earth's surface and are commonly referred to as a "VTOL drone." VTOL drones not only take off and land in a vertical position, but also maintain their VTOL orientation during flight. In order for the VTOL drone to fly and move in a direction along a plane of the Earth's surface after takeoff, the motors can adjust their force in order to pitch the entire craft into a forward, backward, or sideways flight direction. Additionally, some drones utilize sets of motors in order to achieve vertical lift in order to safely take-off and land along with additional motors to provide dedicated forward thrust in order to propel the drone horizontally. In these drones, the frame of the drone maintains the same orientation in relation to the Earth's surface during takeoff, flight, and landing.

However, these types of drones are very inefficient due to the inherent drag and excess weight created by having so many motors and general inefficiency of VTOL craft compared to fixed wing conventional airplanes. Moreover, drones may not be able to collect weather information, for example in a hurricane, tornado, thunderstorm, or fire, due to the limitations of the frame and wind forces/shear encountered. The design of the frame and other components may prevent the drone from withstanding the wind forces and shear. Therefore, there is a long-felt need for a drone to be more energy efficient and capable of flying greater distances and in a variety of climate conditions and environments.

Airplanes with wings, by contrast, are inherently more energy efficient than VTOL drones because of the ability to fly horizontally with respect to a plane of the Earth's surface (i.e., the fuselage is generally parallel to a plane of the Earth's surface during flight). The shape of the fuselage and design of the wings also can make an airplane more energy efficient than a VTOL drone and can allow an airplane to fly greater distances with more available payload capacity than VTOL drones. Airplanes have been used to collect important weather information by flying into a hurricane and other weather events. Aircraft with wings are also better suited for carrying large payloads due to their higher efficiency and greater range.

In order for an airplane to fly horizontally, payload must be balanced along an axis of the wings. Payload must be balanced fore and aft of an imaginary fulcrum, like a fulcrum of a teeter-totter, along the fuselage. The imaginary fulcrum can be referred to as the center of gravity of the airplane. The wings of a fixed wing aircraft also have a center of lift. The center of lift is the location along the chord of an airfoil at which all lift forces produced by the airfoil are balanced. This is generally near the quarter-chord point. A general rule of thumb, depending on the design of an aircraft with wings, is that the center of lift is 10% to 25% of a leading-edge portion of the wings of the airplane. The center of lift is generally adjacent to the center of gravity. For example, if too much weight is placed in the front of the aircraft, then the center of gravity will shift forward and generally the airplane's nose will tip down towards the ground during takeoff, flight, and landing. Likewise, if too much weight is placed in the rear of the aircraft, then the center of gravity shifts back and generally the airplane's nose will tilt up towards the sky. To prevent this from happening, the center of gravity of the wings should be located adjacent to the center of gravity. By way of example, by placing more weight in the front of the airplane, only 5% of the leading-edge portion of the wings may be located adjacent to the center of gravity and the center of lift will not be adjacent to the center of gravity. By way of another example, by placing more weight in the back of the airplane, 35% of the leading-edge portion of the wings may be located adjacent to the center of gravity and the center of lift will not be adjacent to the center of gravity. Thus, careful attention must be paid to load the airplane with payload such that the center of gravity is located adjacent to the center of lift according to the design of the aircraft.

Calculations can be performed on where to place cargo such that the center of lift is adjacent to the center of gravity. Placement of cargo within an airplane can vary for each flight, for example, how many passengers will be flying, how much luggage is present, and the weight of the luggage. It should be noted that the weight of the components of the airplane, such as the nose, fuselage, engines, etc. are part of the calculations. For cargo airplanes, placement of the cargo can also vary depending on the weight of each cargo item to be transported. However, with few exceptions, the center of gravity of an airplane during takeoff, flight, and landing will not change because the cargo remains fixed—that is all of the payload remains within the airplane and the majority of the weight placed fore and aft of the center of gravity will not substantially change during flight. For example, passengers may move about the cabin of the fuselage and fuel will be used, but the weight associated with such movement is negligible compared to the total weight of the airplane and cargo; and as such, does not alter the center of gravity during flight.

If the payload carried by an aircraft changes, then the center of gravity will also change. By way of example, if a small aircraft or drone includes 10 pounds worth of packages in the front of the aircraft and 10 pounds worth of packages in the rear of the aircraft and a 5-pound package in the rear of the aircraft is removed from the aircraft, then the center of gravity will shift forward and the center of lift is no longer adjacent to the center of gravity. More weight will now be in the front part of the aircraft and the center of gravity will change along the fuselage; thus, the leading-edge portion of the wings may fall outside the design limits. Accordingly, there is also a long-felt need for drones to be able to adjust the center of gravity when changes in payload weight and location occur. As used herein, the phrase "adjust the center of gravity," and "adjust the center of lift" and all grammatical variations thereof means the ability to move the center of gravity or move the center of lift along a longitudinal axis of a fuselage such that the center of lift and the center of gravity are kept within the design limits for the aircraft. According to certain embodiments, the design limits may include that the center of lift is 10% to 25% of a leading-edge portion of the wings and is located adjacent to the center of gravity.

It has been discovered that a drone can include wings such that the drone is capable of flying horizontally like an airplane. It has also been discovered that the center of gravity and/or the center of lift of the drone can be adjusted to accommodate changes in weight fore and aft along the fuselage. The drone solves the long-felt needs of being more efficient and having an adjustable center of gravity.

According to certain embodiments, a drone comprises a fuselage; a first wing extending from a starboard side of the fuselage; a second wing extending from a port side of the fuselage; at least two propellers; at least three landing rods located adjacent to the first wing, the second wing, or the first and second wings; an adjustable center of gravity, an adjustable center of lift, or an adjustable center of gravity and center of lift; and a payload carrier. The first wing and the second wing can be configured to swing away from or towards the fuselage to adjust the center of lift. The first wing and the second wing can also be configured to slide fore or aft along the fuselage to adjust the center of lift. At least a portion of the payload carrier can also be configured to move fore or aft along the fuselage to adjust the center of gravity. It is to be understood that other means may be utilized to adjust the center of gravity in addition to the aforementioned means.

Figure 1:
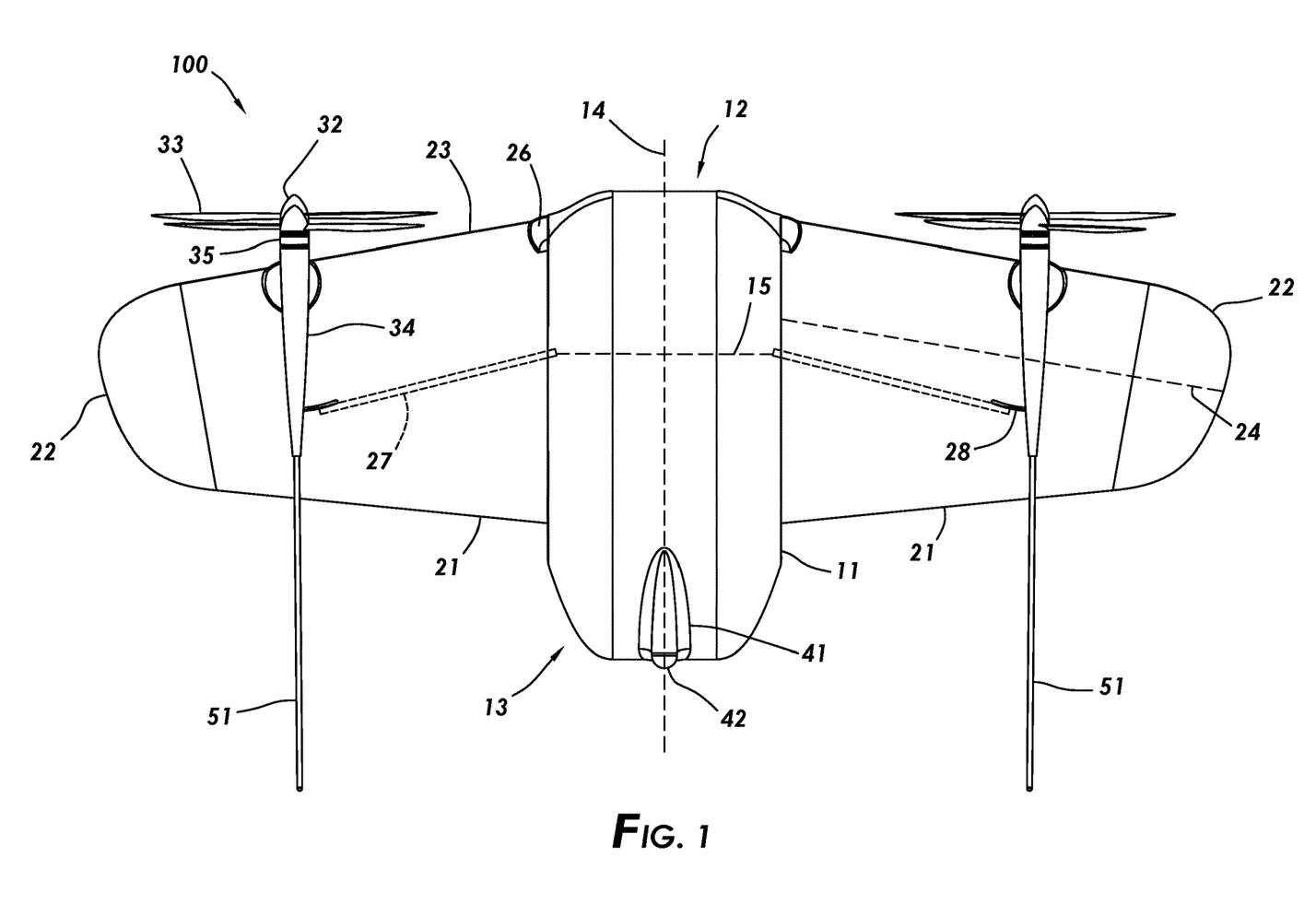
FIG. 1 is a top view of a drone in a horizontal flight mode according to certain embodiments.
Figure 2:
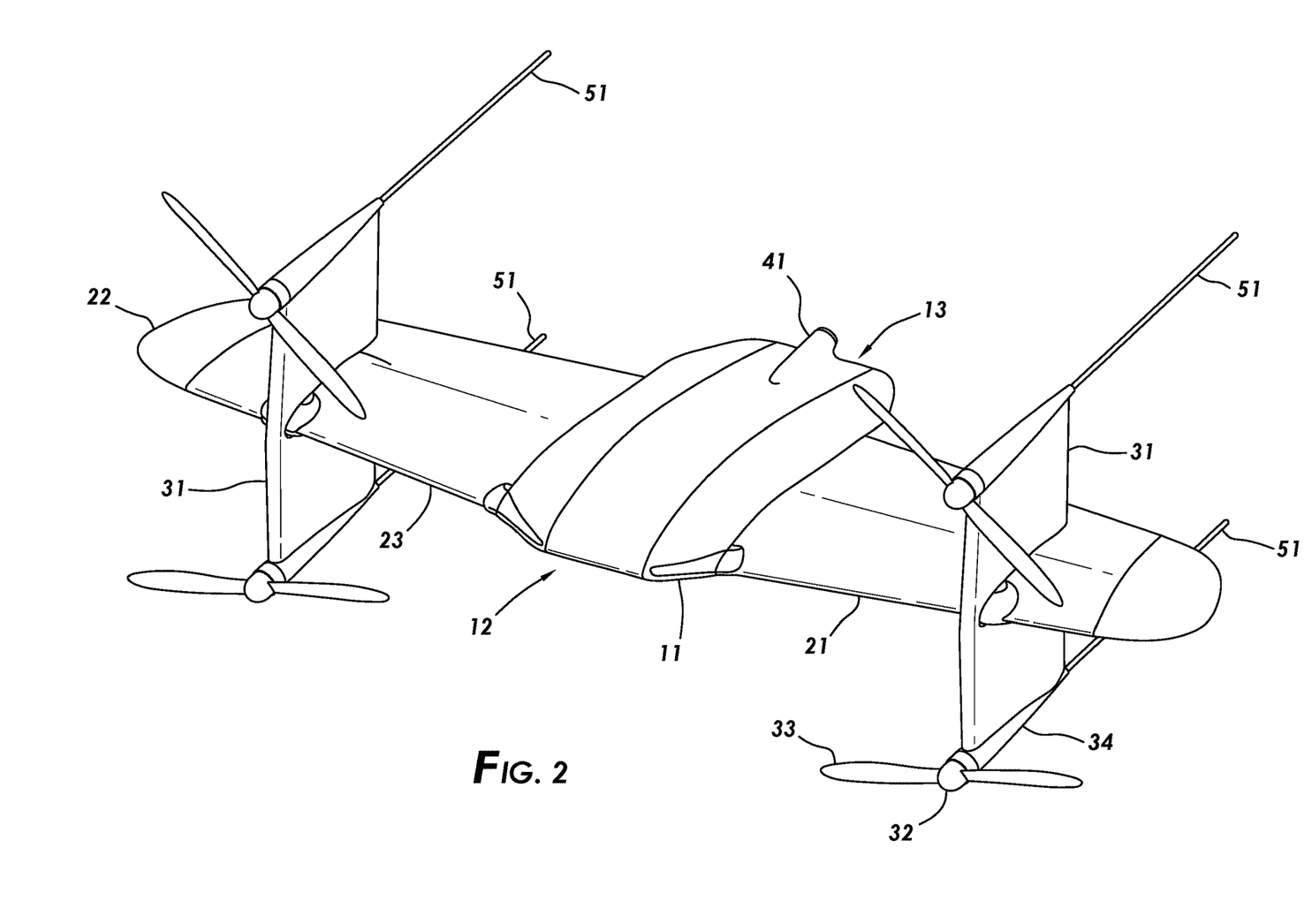
FIG. 2 is a front, side perspective view of the drone of FIG. 1.

Turning to the figures, FIGS. 1 and 2 are a top view and front, perspective view of a drone 100 according to any of the embodiments. The drone 100 can include a fuselage 11. The fuselage 11 can include a front of the fuselage 12 and a rear of the fuselage 13. The fuselage 11 can also include a longitudinal axis 14 that spans from the front of the fuselage 12 to the rear of the fuselage 13. The fuselage 11 has a length and a width. The length of the fuselage 11 can be greater than the width. The fuselage 11 can have a variety of shapes and can be substantially flat, for example, as shown in FIG. 2, or can have a substantially cylindrical shape, for example, as is common for airplanes. The front of the fuselage 12, the rear of the fuselage 13, or the front of the fuselage 12 and the rear of the fuselage 13 can taper from the rest of the fuselage 11. A tapered front and/or rear of the fuselage can be used to improve aerodynamics of the drone 100 during flight.

The drone 100 can include a first wing 21 extending from a starboard side of the fuselage 11 and a second wing 21 extending from a port side of the fuselage 11. It is to be understood that reference to the starboard and port sides of the fuselage are for reference purposes to make clear that the drone includes at least two wings that are located on opposite sides of the fuselage. For example, the first wing can extend from the port side of the fuselage and the second wing can extend from the starboard side.

The wings 21 can have a variety of shapes and dimensions. As can be seen, for example, in FIG. 1, the width of the wings 21 can taper from the portion that is adjacent to the fuselage 11 to the wing tip 22. The wings 21 can also include a leading edge 23 that is located adjacent to the front of the fuselage 12. The wings 21 can also include a trailing edge 25 that is located adjacent to the rear of the fuselage 13. The wings 21 can have a uniform thickness, can taper from the leading edge 23 to the trailing edge 25, or can taper from the area adjacent to the fuselage 11 to the wing tip 22. The wing tips 22 can also include a winglet (not shown). Winglets can be used to decrease drag of the drone 100 during horizontal flight.

The drone 100 can also include at least two propellers. According to any of the embodiments, one propeller is affixed to the first wing 21 and the other propeller is affixed to the second wing. According to any of the embodiments, the number of propellers is an even number, and the same number of propellers are affixed to each wing (i.e., 2 propellers affixed to the first wing and 2 propellers affixed to the second wing). According to any of the embodiments, one propeller can be affixed to a front of the fuselage 12 and the other propeller can be affixed to a rear of the fuselage 13 (not shown). According to this embodiment, the two propellers can rotate in opposite directions around the propeller hub 32, for example, the propeller at the front of the fuselage can rotate clockwise around the hub and the propeller at the rear of the fuselage can rotate counterclockwise around the hub in relation to the longitudinal axis of the fuselage. Motors can also be mounted to the front or rear of the fuselage 11 (not shown). The at least two propellers can be affixed to the wings 21 near the leading edge 23 of the wings 21. Each propeller can include a propeller hub 32, propeller blades 33, and a propeller motor 35. The number of propeller blades 33 for each propeller can vary and be selected based on the size of the motors, size of the drone, intended payload, or other engineering criteria. According to any of the embodiments, electronics for the propellers (e.g., propeller motor speed controllers, and a power source, for example batteries), can be located within a housing 34. Other components of the drone 100 can also be located within the housing 34. The power source can also be housed within other components of the drone, for example, in a vertical connector 31.

As can be seen in FIG. 2, the drone 100 can include 4 propellers—a first and second propeller affixed to the first wing 21 and a third and fourth propeller affixed to the second wing 21. Of course, there can be more than 4 propellers, for example, 6 propellers, 8 propellers, etc. For 4 or more propellers, different configurations are possible, such as two propellers affixed to the first and second wings, one propeller affixed to the front of the fuselage, and one propeller affixed to the rear of the fuselage. According to the embodiments where 4 or more propellers are present, the drone 100 can further include at least 2 vertical connectors 31. The propellers for each of the wings 21 can be connected via a vertical connector 31. By way of example, the first and second propellers can be affixed to the first wing via a first vertical connector 31, and the third and fourth propellers can be affixed to the second wing via a second vertical connector 31. The vertical connectors 31 can be located at a variety of locations along the wings 21, but preferably are not located near the wing tips 22. The vertical connectors 31 can be substantially planar and can extend in both directions away from a top and a bottom of the wings 21. A housing 34 can be located at the top and bottom of each vertical connector 31. The height of the vertical connectors 31 can be selected such that the propeller blades 33 of each propeller has enough clearance from each other such that the propeller blades 33 do not hit each other when in operation (e.g., the blades from the first propeller do not hit the blades from the second propeller). The height of the vertical connectors 31 can be in the range of 10 to 48 inches.

A front edge of the vertical connectors 31 can be located in-line with or extend past the leading edge 23 of the wings 21 (shown in the drawings as extending past the leading edge 23). A back edge of the vertical connectors 31 can be located partially forward of, in-line with, or extending past the trailing edge 25 of the wings 21 (shown in the drawings as being located partially forward of the trailing edge 25).

The drone 100 can also include at least 3 landing rods 51. There can also be 4, 5, or more landing rods 51. The landing rods 51 can be located adjacent to the first wing 21, the second wing 21, or both of the first and second wings 21. According to any of the embodiments, the landing rods 51 extend away from the rear of the fuselage 13. As shown in the figures, the landing rods 51 can extend from a rear of the housings 34. According to any of the embodiments, there is at least one landing rod 51 extending from the first wing 21 and at least a second landing rod extending from the second wing. A third landing rod can extend from the fuselage 11. According to any of the embodiments, at least one of the 3 or more landing rods 51 is offset from the other landing rods 51 and not in-line with the other landing rods. If all of the landing rods 51 were in-line with one another, then the drone 100 would not be capable of remaining upright before takeoff and after landing. As can be seen in FIG. 2, for example, there are 4 total landing rods 51 with a first and second landing rod being in-line with each other above the longitudinal axis of the fuselage, a third and fourth landing rod being in-line with each other below the longitudinal axis, and the first and second landing rods being offset from the third and fourth landing rods in relation to the longitudinal axis of the fuselage. Other configurations and placement can be utilized so long as the drone 100 can maintain an upright vertical orientation before takeoff and after landing.

The drone 100 can be configured to takeoff and land in a vertical orientation. As used herein, the phrase "vertical orientation" means the longitudinal axis 14 of the fuselage 11 of the drone 100 is substantially perpendicular to a plane of the Earth's surface. Payload can be loaded onto the drone 100 prior to takeoff. After takeoff, the drone 100 can convert to a horizontal orientation for flight. As used herein, the phrase "horizontal orientation" means the longitudinal axis 14 of the fuselage 11 of the drone 100 is substantially parallel to a plane of the Earth's surface. The drone 100 can then convert back to a vertical orientation in order to land.

The drone 100 takes off in the vertical orientation and can ascend upwards to a predetermined elevation. A remote operator can convert the drone from the vertical orientation to the horizontal orientation or the drone can be pre-programmed to convert to the horizontal orientation after the drone reaches the predetermined elevation. The drone can be converted to the horizontal orientation via a variety of means. By way of example, power to one or more of the propeller motors 35 can be increased, power to one or more of the propeller motors 35 can be decreased, or power to one or more of the propeller motors 35 can be increased and power to other propeller motors 35 can be decreased. For example, the propellers located adjacent to a top surface of the wings can have the power increased, which will rotate the front of the fuselage 12 over towards the ground to bring the fuselage into the horizontal orientation. By way of another example, the drone 100 can further include flight control surfaces 17 (shown in FIG. 5). The flight control surfaces 17 can include without limitation a vertical stabilizer, a horizontal stabilizer, a rudder, elevators, ailerons, and combinations thereof. The flight control surfaces 17 can be located on the wings 21, the vertical connectors 31, other components of the drone, and combinations thereof. The flight control surfaces 17 can be used instead of or in addition to modifying the power to the propeller motors 35 in order to convert the drone 100 from the vertical orientation to the horizontal orientation. An actuator can also be used to convert the drone from the vertical orientation to the horizontal orientation. It should be understood that VTOL drones that include at least 4 motors may be capable of tipping over into a somewhat horizontal orientation; however, the VTOL drone would crash immediately because there are no wings or clearly defined fuselage that would allow the VTOL drone to fly horizontally.

After the drone 100 has converted to the horizontal orientation for flight, power to the propeller motors 35 and/or the flight control surfaces 17 can be modified for flight. For example, the drone 100 can be pre-programmed or remotely controlled by an operator to fly at different speeds and altitudes. By way of example, power to the propeller motors 35 can be modified such that each propeller motor 35 receives substantially the same amount of power during flight. When the drone 100 reaches a landing destination, then the drone 100 can be converted from the horizontal orientation to the vertical orientation for landing. As with takeoff, power to the propeller motors 35 can be increased and/or decreased and the flight control surfaces 17 can be modified to convert the drone back to the vertical orientation. The drone 100 can then descend from the conversion altitude and land on the landing rods 51.

The fuselage 11 can also include a tail section 41. The tail section 41 can be located at the rear of the fuselage 13. As can be seen in FIGS. 1 and 2, the tail section 41 can be a housing that extends away from a top of the fuselage 11. The tail section 41 can house a navigational camera 42 and/or other components, such as a global positioning system ("GPS"). The navigational camera 42 can be used by a remote operator controlling the drone or used in conjunction with autonomous systems to navigate, land and fly the drone, and avoid obstacles. The navigational camera 42 can be positioned such that a lens of the navigational camera 42 faces towards the ground when the drone 100 is in the vertical orientation before takeoff and after landing and faces backwards when the drone 100 is in the horizontal orientation during flight. The navigational camera 42 can also be positioned in different view orientations. The navigational camera 42 can also be positioned at a different location on the drone 100 other than the tail section 41, for example on the trailing edge 25 of one or both wings 21. Preferably, the navigational camera 42 is positioned towards the rear of the drone 100 such that the ground is visible via the navigational camera 42. In this manner, a remote operator or an autonomous system can ensure that there are no obstacles in the way in the landing spot. There can also be more than one navigational camera 42 positioned at different locations towards the rear of the drone 100.

The drone 100 also includes a center of gravity 15. As discussed above, the center of gravity 15 is an imaginary fulcrum located along a longitudinal axis 14 of the fuselage 11. As can be seen, for example, in FIG. 1, the center of gravity 15 can be perpendicular to the longitudinal axis 14 of the fuselage 11. Depending on the placement and weight of payload carried by the drone 100, the center of gravity 15 can change. For example, the center of gravity 15 can move closer towards the front of the fuselage 12 or move closer to the rear of the fuselage 13. According to any of the embodiments, the center of lift is a desired percentage of a leading-edge portion 24 of the wings 21 and is located adjacent to the center of gravity 15. The desired percentage can be any percentage in which the center of lift is adjacent to the center of gravity and weight that is fore and aft of the center of gravity 15 is balanced. Non-limiting desired percentages can be 10% to 35%.

Figure 3:
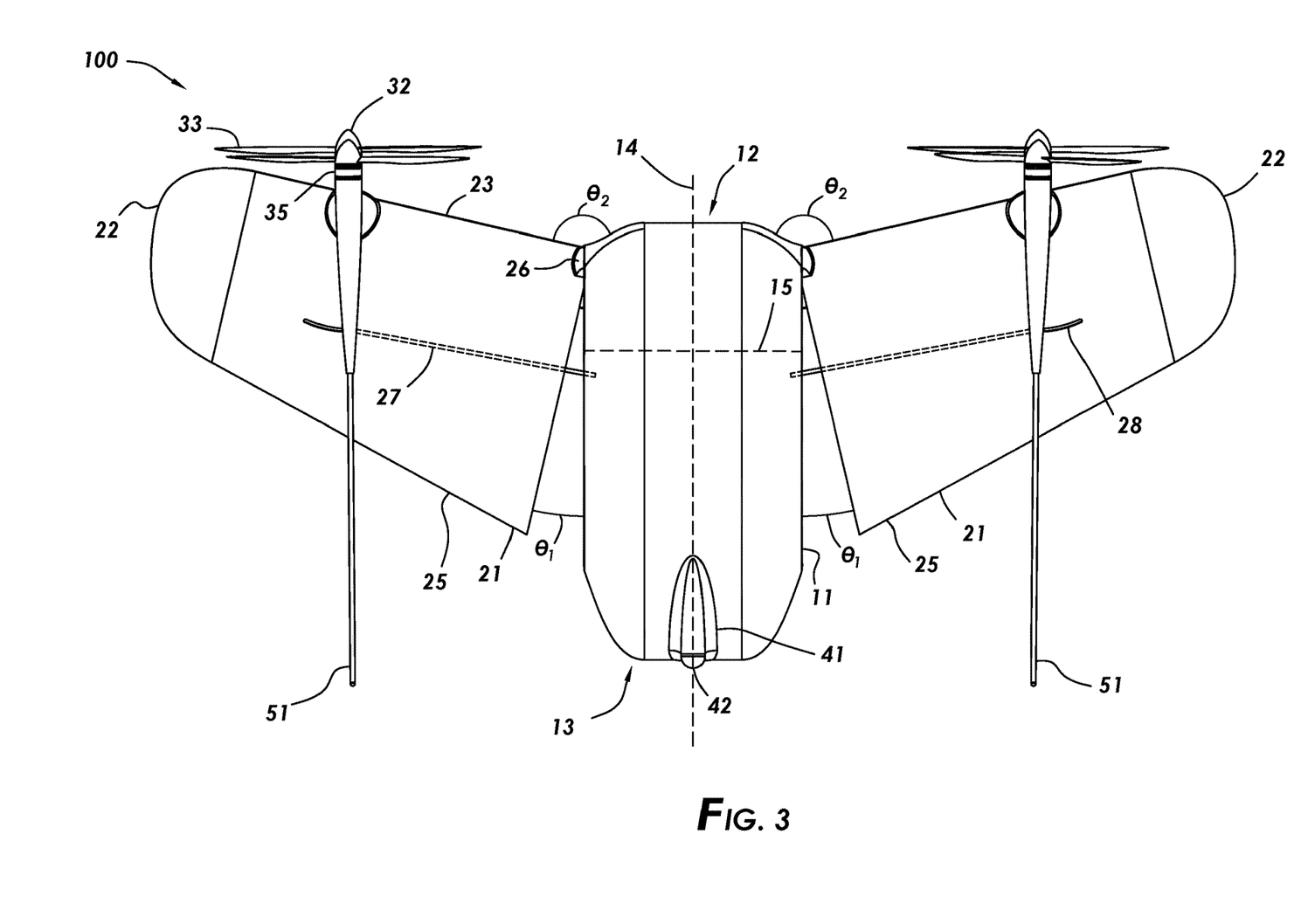
FIG. 3 is a top view of the drone for adjusting the center of gravity according to certain embodiments.

The center of gravity 15 and the center of lift are adjustable. According to a first embodiment and as shown in FIGS. 1-4, the first and second wings 21 are configured to swing away from or towards the fuselage 11 to adjust the center of lift to be adjacent to the center of gravity. The first wing 21 and the second wing 21 can be connected to the front of the fuselage 12 via a hinge 26. The vertical connectors 31 can also be indirectly connected to the fuselage 11 via an alignment connector rod 27. The alignment connector rod 27 can be connected at one end and extending a portion into the fuselage 11, traverse through the interior of the wings 21, and be connected at the opposite end to the vertical connectors 31. A top and/or bottom surface of the wings 21 can include a connector rod cutout 28 located on one or both sides of the vertical connectors 31. The connector rod cutout 28 can provide access to physically connect an end of the alignment connector rod 27 to the vertical connectors 31 and also provides access to make any necessary adjustments to the rod connected to the vertical connectors. As can be seen in FIG. 3, when the first and second wings 21 swing away from the fuselage 11, the alignment connector rod 27 maintains the vertical connectors 31 in substantially the same orientation with respect to the longitudinal axis 14 of the fuselage 11 as before swinging away. That is, the vertical connectors 31 and the propeller blades 33 maintain the same orientation to the fuselage 11 regardless of whether the wings 21 swing away from or towards the fuselage 11 (a parallel orientation for the vertical connectors and a perpendicular orientation for the propeller blades). In this manner, the propeller blades 33 are always facing forward and perpendicular to the fuselage 11 so the drone 100 is capable of flying in a straight line with maximum efficiency.

Figure 4:
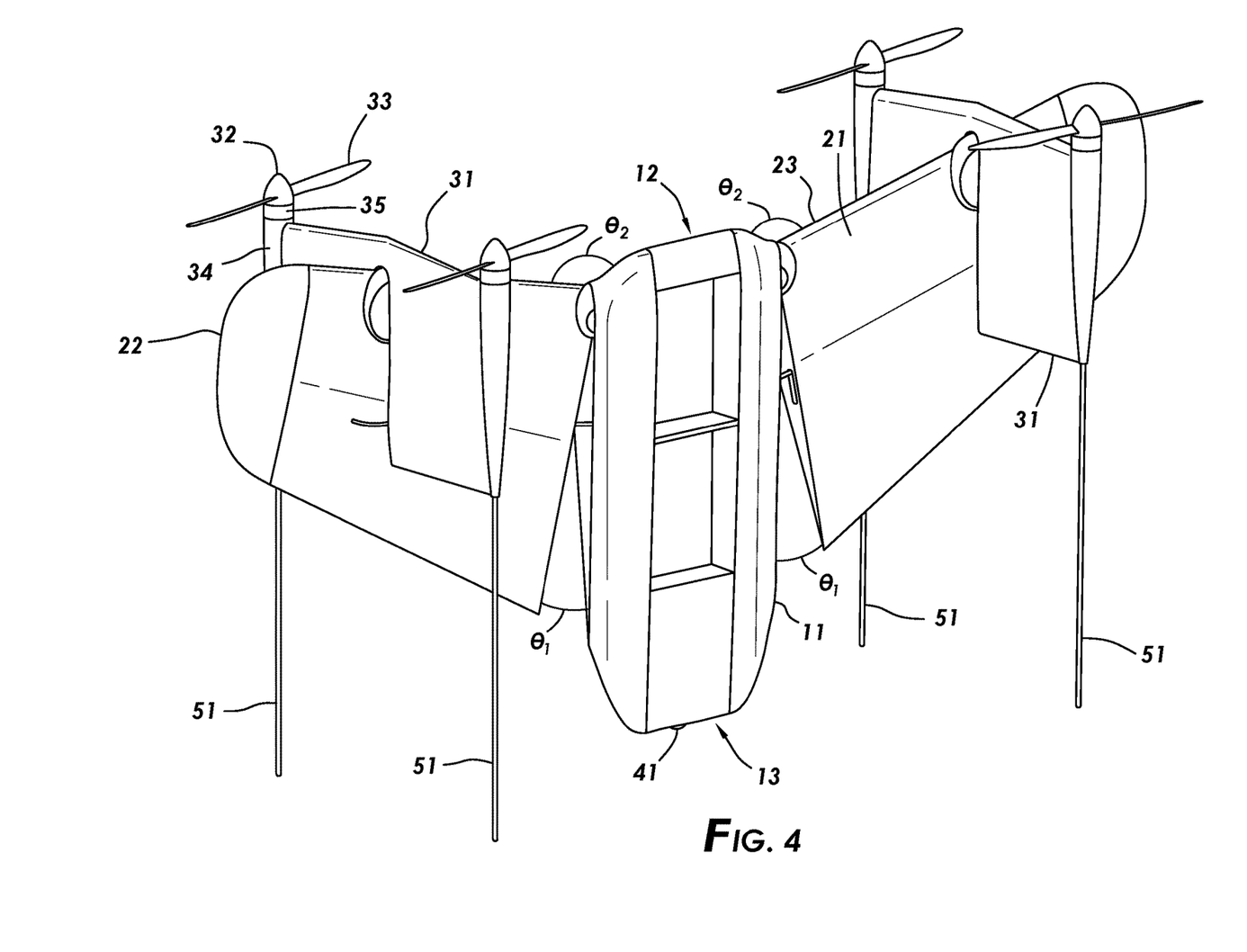
FIG. 4 is a bottom perspective view of the drone of FIG. 3.

As can be seen in FIGS. 3 and 4, as the wings 21 swing away from the fuselage 11, an angle $\theta_1$ is created between a trailing edge 25 of the wings 21 and an outside of the fuselage 11. Another angle $\theta_2$ is created between the leading edge 23 of the wings 21 and a front of the fuselage 12 near the location of the hinge 26. As can be seen for example in FIG. 1, before the wings 21 swing away from the fuselage 11, $\theta_2$ can be in the range of 180° to 220° and $\theta_1$ can be 0°. According to certain embodiments, the trailing edge 25 of the wings 21 can recess slightly into the fuselage 11 making $\theta_1$ a negative angle. As the wings 21 swing away from the fuselage 11, as shown in FIGS. 3 and 4, $\theta_1$ can increase to an angle greater than 0° (e.g., between 5° and 50°) and $\theta_2$ can decrease to an angle less than 220° or less than 180° as shown in FIG. 3. As can also be seen in FIG. 3 after the wings have swung away from the fuselage, the center of gravity 15 moves closer to the front of the fuselage 12.

The amount of increase and decrease of $\theta_1$ and $\theta_2$ may be limited by the length of the wings 21 from the fuselage 11 to the wing tip 22, the location of the propeller blades 33 along the leading edge 23 of the wings 21, and how far away from the leading edge 23 of the wings 21 that the propeller blades 33 are located. Accordingly, because the vertical connectors 31 and propeller blades 33 maintain their original orientation as the wings 21 swing away from the fuselage 11, the distance between the propeller blades 33 and the wing tips 22 will decrease, for example as shown in FIG. 3. Therefore, $\theta_1$ should not increase and $\theta_2$ should not decrease enough such that the propeller blades 33 make contact with any part of the wings 21, which would impede or prevent flight. In order to avoid this possible limitation to the changes of $\theta_1$ and $\theta_2$, the height of the vertical connectors 31 can be selected such that the propeller blades 33 are not capable of coming into contact with any portion of the wings 21 regardless of how much $\theta_1$ increases and $\theta_2$ decreases. By way of example, if the propeller blades 33 have a radius of 3 inches and the thickness of the wings 21 is 2 inches, then the height of the vertical connectors 31 can be at least 8 inches. In this manner, none of the propeller blades 33 would come in contact with the top, leading edge, or bottom of the wings 21. For a propeller affixed to the front of the fuselage, the propeller blades can be extended a desired distance away from the front of the fuselage such that the propeller blades do not make contact with a leading edge of the wings.

Figure 5:
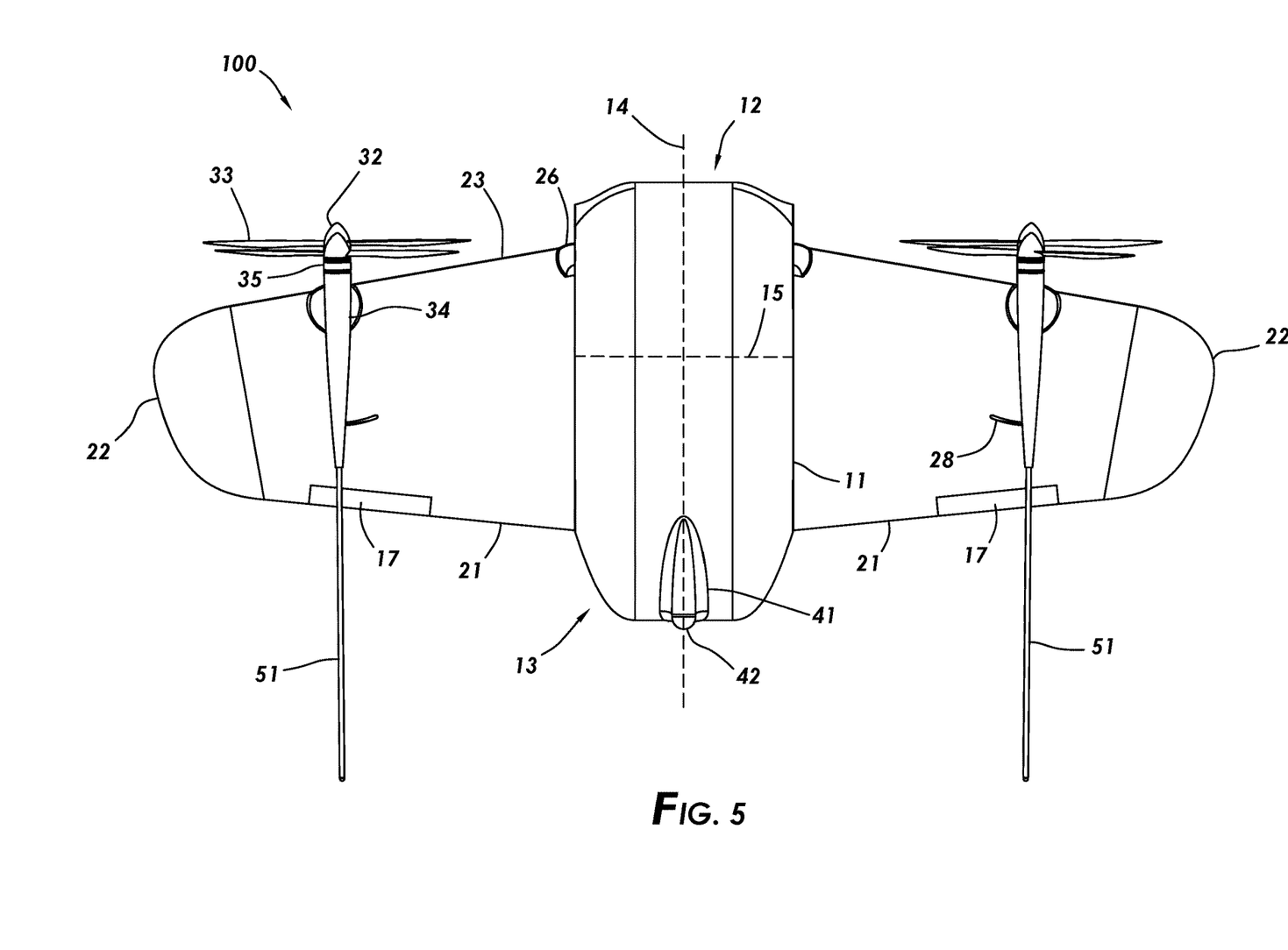
FIG. 5 is a top view of the drone for adjusting the center of gravity according to certain other embodiments.

According to a second embodiment, the wings 21 are configured to slide fore or aft along the fuselage 11 to adjust the center of lift. This embodiment is shown in FIGS. 1 and 5. As can be seen in FIG. 1, the wings 21 have slid fore along the fuselage 11 and are located closest to the front of the fuselage 12. In FIG. 5, the wings 21 have slid aft along the fuselage 11, the trailing edge 25 of the wings 21 is located closer to the rear of the fuselage 13, and the center of gravity 15 has moved closer to the rear of the fuselage 13. The fuselage 11 can include a sliding groove or track (not shown) along both sides of the fuselage. The wings 21 can include one or more protrusions that matingly and slidingly engage with the sliding groove or track. In this manner, the one or more protrusions affix the first and second wings 21 to the fuselage 11 and allows the wings 21 to slide fore and aft along the fuselage 11 to adjust the center of gravity 15. The drone 100 can also include actuators and motors that move the wings 21 to slide along the fuselage 11. Although FIGS. 1 and 5 show a connector rod cutout 28, it is to be understood that this component may not be needed when the wings slide because the propeller blades 33 will maintain a consistent orientation with respect to the fuselage 11. The groove and track can include roller bearings with ball screw actuators or other mechanical devices to ensure smooth adjustment and the wings remain in the desired location after sliding. According to another embodiment, the groove or track can also include one or more stops that secure the wings at the desired location along the fuselage after sliding. The stops can be a retractable protrusion that are activated to extend into the groove or track based on where the desired location of the wings is. The stops can be in a retracted position in order for the wings to slide along the fuselage. All of the stops or only select stops can then be extended into the groove or track to keep the wings at the desired location.

Figure 6:
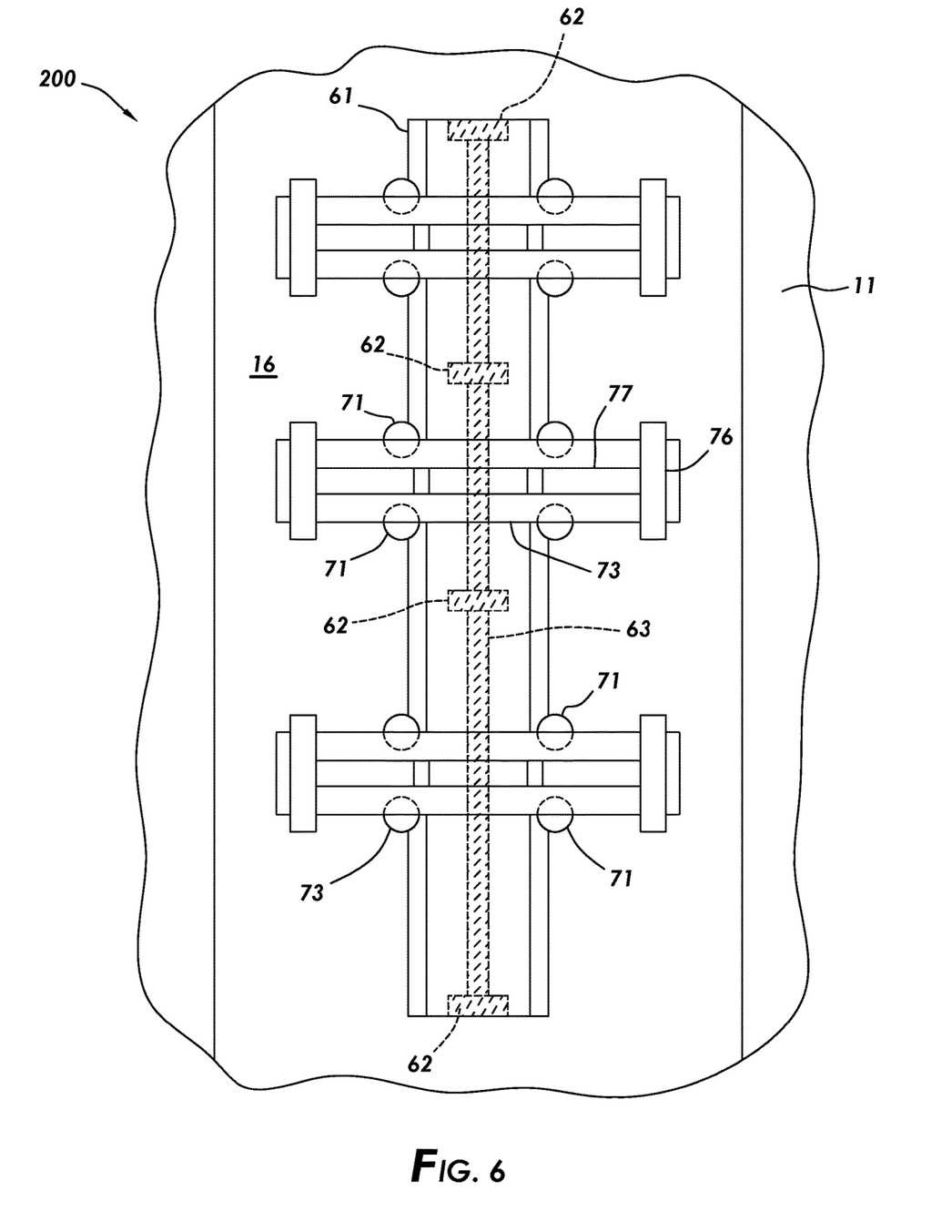
FIG. 6 is a bottom view of a bottom of a fuselage of the drone for adjusting the center of gravity according to certain other embodiments.
Figure 7:
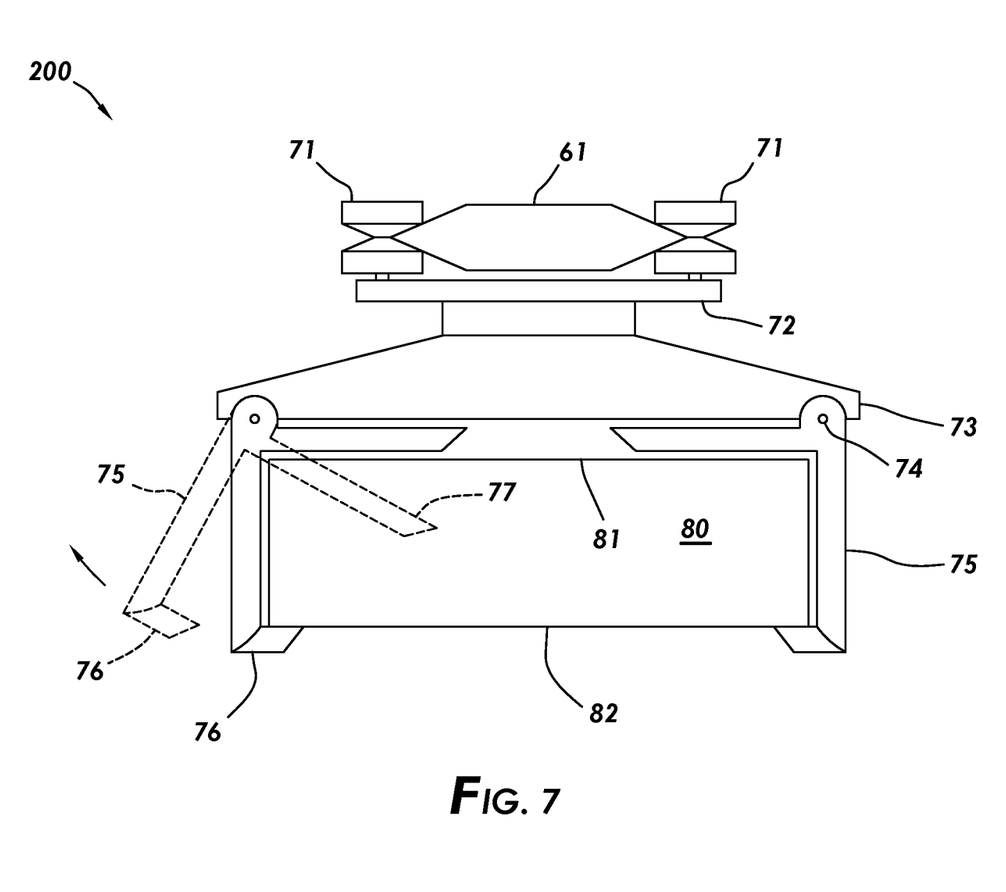
FIG. 7 is a cross-sectional side view of a payload carrier according to certain embodiments.

The drone 100 also includes a payload carrier 200. FIGS. 6 and 7 illustrate the payload carrier 200 according to any of the embodiments. The payload carrier 200 is configured to carry a payload 80. Non-limiting examples of the payload 80 include camera equipment (including infrared cameras for detecting fires), surveying equipment, meteorological equipment (e.g., anemometers, thermometers, barometers, hygrometers, and rain gauges), fire control substances for aerial firefighting (e.g., water or long-term fire retardants), and business or consumer packages. The payload carrier 200 can be located on an underneath side 16 of the fuselage 11. In this manner, the payload 80 is located underneath the fuselage 11 during horizontal flight. The payload carrier 200 can be configured such that the payload 80 extends away from the bottom of the fuselage 16. This may expose the payload 80 to wind, rain, or other environmental conditions. The payload carrier 200 can include one or more flaps of material that can extend from the underneath side 16 of the fuselage 11 to provide partial or total protection from environmental conditions. The payload carrier 200 can also be recessed into the fuselage 11 similar to a cargo bay such that the payload 80 is partially or totally protected from environmental conditions. According to this embodiment, the payload carrier 200 can further include cargo doors (not shown) that can open and close. When closed, the cargo doors can protect the payload 80 from environmental conditions. When open, the payload 80 can take weather measurements, release fire control substances, deliver business or consumer packages, etc.

The payload carrier 200 can include one or more components that secure the payload 80 in the payload carrier 200. By way of a non-limiting example and as shown in FIG. 7, the one or more components can include two or more arms 75. The arms 75 can wrap around the outer perimeter of the payload 80 such that the payload is secured within the payload carrier 200. The arms 75 can be a variety of shapes and dimensions. The arms 75 can span partially or wholly the dimensions of the payload 80. The arms 75 can be positioned in-line with the longitudinal axis 14 of the fuselage 11. This embodiment can be understood by rotating the foot of the arm 76 and the protruder 77 shown in FIG. 6 90° clockwise or counter-clockwise. In this manner, when the drone 100 is in the vertical orientation before takeoff and for landing, the payload 80 does not undesirably fall out of the payload carrier 200. Each of the arms 75 can include a foot of the arm 76. The foot of the arm 76 can form an L-shape with the arms 75 as seen in FIG. 7 such that the foot of the arm 76 makes contact with an exterior-facing portion 82 of the payload 80 in order to secure the payload within the payload carrier 200. The arms 75 can also include a telescoping portion (not shown) such that the foot of the arm 76 makes contact with the exterior-facing portion 82 of the payload 80. The foot of the arm 76 can also be perpendicular to the arms 75 when viewing the payload carrier 200 from the underneath side 16 of the fuselage 11 as seen in FIG. 6.

According to any of the embodiments, the payload 80 is secured within the payload carrier 200 for the duration of use of the drone 100. For example, camera or surveying equipment may remain secured within the payload carrier 200 from the time the payload is loaded onto the drone, during flight, and until the drone returns to the desired destination.

According to any of the embodiments, the payload 80 is not secured within the payload carrier 200 for the duration of use of the drone. For example, the payload 80 can include business or consumer packages that are intended to be delivered to a delivery address. In this example, the payload 80, which can include one or more packages, can be loaded onto the drone, the drone can fly to a first delivery address, a package can be released from the payload carrier 200 for delivery, and the drone can then return to a desired final destination. In the case where more than one package is loaded onto the drone, after delivery of the first package, the drone can fly to a second delivery address, another package can be released from the payload carrier 200 for delivery, and the drone can then fly to a third, fourth, and so on delivery address or return to the desired final destination. The arms 75 can further include a protruder 77. The protruder 77 can be in-line with the arms 75 and can form a U-shape with the arms 75 and the foot of the arm 76 as shown in FIG. 7. The protruder 77 can make contact with an interior-facing portion 81 of the payload 80.

The payload carrier 200 can include a carriage 73. The arms 75 and the protruder 77 can be connected to the carriage 73 via a hinge 74. According to any of the embodiments, the arms 75, the foot of the arm 76, and the protruder 77 are formed as a solid unit and do not move in relation to each other. The carriage 73 can include a motor. The motor can actuate the arms 75 and the protruder 77 to rotate outwardly via the hinge 74 as shown in FIG. 7. Actuation pushes the foot of the arm 76 away from a bottom of the payload 80 (e.g., a package for delivery) such that the payload 80 is no longer secured within the payload carrier 200 and also moves the protruder 77 downwardly to push the payload 80 away from the underneath side 16 of the fuselage 11.

The payload carrier 200 can also include a base 72. The carriage 73 can be located underneath the base 72 when viewing the fuselage 11 along the longitudinal axis 14 in the horizontal orientation. According to any of the embodiments, the payload carrier 200 can further include a telescoping rod (not shown) that can extend the carriage 73 away from the underneath side 16 of the fuselage 11 or the base 72. This embodiment can be useful if a package to be delivered first is located in the middle of other packages or near the front of the fuselage 12. Accordingly, the carriage 73 for the first package to be delivered can be extended such that the first package has clearance from the other packages during delivery. It should be noted that although the discussion is described in relation to an underneath side 16 of the fuselage 11, when packages are delivered, the drone 100 will be in the vertical orientation and therefore, the underneath side 16 of the fuselage 11 will be perpendicular to the ground instead of parallel as during horizontal flight.

According to another embodiment, at least a portion of the payload carrier 200 is configured to move fore or aft along the fuselage 11 to adjust the center of gravity 15 with a fixed center of lift. As can be seen in FIGS. 6 and 7, the payload carrier 200 can include a track 61 located on the underneath side 16 of the fuselage 11. One or more carriages 73 can be slidingly connected to the track 61, for example, via roller bearings 71. A shaft 63 can span a length of the track 61. There can also be two or more payload shifting devices 62 attached to the shaft 63. By way of example, a first payload shifting device 62 can be located at one end of the shaft 63, and a second payload shifting device 62 can be located at the other end of the shaft 63. There can also be a pair of payload shifting devices 62 for each payload to be carried—one located on one side of the payload and the other located on the other side of the payload. The payload shifting devices 62 can be any device, such as a ball screw, that moves all of the payload together (in the case of only 2 payload shifting devices) or individual pieces of payload (in the case of pairs of payload shifting devices) fore or aft along the underneath side 16 of the fuselage 11. The payload shifting devices 62 can be actuated to move one or all of the carriages 73 that carry the payload 80, such as for example, like an auger. According to any of the embodiments, movement of all or some of the payload 80 can be moved along the fuselage 11 as the sole means for adjusting the center of gravity 15. According to any of the embodiments, movement of all or some of the payload 80 can be used in conjunction with swinging of the wings 21 or sliding of the wings 21 to adjust the center of gravity 15 and center of lift. However, if the wings 21 are used to adjust the center of lift, then it is to be understood that the wings 21 are not configured to both swing away from or towards the fuselage and slide fore or aft along the fuselage.

According to any of the embodiments, the center of gravity 15 and/or the center of lift can be manually adjusted before takeoff. The center of gravity 15 can be predetermined based in part on the dimensions and weight of each piece of the payload 80 to be carried by the drone 100. By way of example, camera equipment can weigh more than weather measurement equipment. The payload 80 can be loaded into the payload carrier 200 and the wings 21 can be adjusted by swinging the wings away from the fuselage 11 or slid along the fuselage 11 or the payload shifting devices 62 can be actuated to move the payload 80 along the fuselage 11 such that the center of lift is adjacent to the center of gravity.

Swinging of the wings 21 away from or towards the fuselage 11 can adjust the center of lift such that the center of lift is adjacent to the center of gravity 15. The following are non-limiting examples of how the swinging of the wings can adjust the center of lift. By way of example, cargo that can be carried by the drone 100 remains fixed (i.e., is not removed from the drone) for the duration of use. Examples of cargo that may remain fixed include, but are not limited to, camera equipment, surveillance equipment, and weather measurement equipment. The cargo can have different weights and may need to be loaded with the heaviest piece of cargo near the center point of the longitudinal axis 14 and the lighter pieces located forward and behind the heaviest piece. If there is more weight near the rear of the fuselage 13, then the center of gravity 15 will move back towards the rear, and the wings can be swung back towards the fuselage so the desired $\theta_1$ and $\theta_2$ is achieved and the center of lift is adjacent to the center of gravity. If there is more weight near the front of the fuselage 12, then the center of gravity 15 will move forwards towards the front, and the wings can be swung away from the fuselage so the desired $\theta_1$ and $\theta_2$ is achieved and the center of lift is adjacent to the center of gravity. Alternatively, the wings 21 and/or at least a portion of the payload carrier 200 can be slid along the fuselage 11 to adjust the center of gravity 15 and/or the center of lift.

According to another example for cargo that does not remain fixed (e.g., packages that are to be delivered), the wings 21 can swing away from or towards the fuselage 11 after each package is delivered. For example, if the first package that is delivered is located near the front of the fuselage 12, then after the package is delivered, there will be more weight in the rear of the fuselage 13 and the center of gravity 15 shifts back. Accordingly, the wings 21 can swing toward the fuselage 11 to adjust the center of lift of the wings to be adjacent to the center of gravity 15. According to a second example, if the first package to be delivered is located near the rear of the fuselage 13, then after the package is delivered, there will be more weight in the front of fuselage 12 and the center of gravity will shift forwards. Accordingly, the wings 21 can swing away from the fuselage 11 to adjust the center of lift of the wings to be adjacent to the center of gravity 15.

According to another example for packages that are to be delivered, the wings 21 can slide fore or aft along the fuselage 11 after each package is delivered. For example, if the first package that is delivered is located near the front of the fuselage 12, then after the package is delivered, there will be more weight in the rear of the fuselage 13 and the center of gravity 15 will shift back. Accordingly, the wings 21 can slide back along the fuselage 11 to adjust the center of lift of the wings to be adjacent to the center of gravity 15. According to a second example, if the first package to be delivered is located near the rear of the fuselage 13, then after the package is delivered, there will be more weight in the front of fuselage 12 and the center of gravity 15 will shift forward. Accordingly, the wings 21 can slide forward along the fuselage 11 to adjust the center of lift of the wings to be adjacent to the center of gravity 15.

According to another example for packages that are to be delivered, at least a portion of the payload carrier 200 can move fore or aft along the fuselage 11 after each package is delivered and the center of lift of the wings remains fixed (i.e., the wings do not swing or slide). For example, if the first package that is delivered is located near the front of the fuselage 12, then after the package is delivered, there will be more weight in the rear of the fuselage 13 and the center of gravity 15 will shift back. Accordingly, at least one or all of the remaining packages can be moved fore along the fuselage 11 to adjust the center of gravity 15 forward to be adjacent to the center of lift of the wings. According to a second example, if the first package to be delivered is located near the rear of the fuselage 13, then after the package is delivered, there will be more weight in the front of fuselage 12 and the center of gravity 15 will shift forward. Accordingly, at least one or all of the remaining packages can be moved aft along the fuselage 11 to adjust the center of gravity 15 back to be adjacent to the center of lift of the wings.

The embodiments can be used to adjust the drone configuration such that the center of gravity 15 is adjacent to the center of lift. The center of gravity 15 can be adjusted based on the design limits of the drone 100. The center of gravity 15 can be adjusted such that approximately ⅓ of the wings 21 from the leading edge 23 is in front of the center of gravity 15 and the other ⅔ of the wings is behind the center of gravity 15. Accordingly, some or all of the payload can slide fore or aft along the fuselage to adjust the center of gravity. The embodiments can be used to adjust the center of lift such that the center of lift is adjacent to the center of gravity. Accordingly, the wings can swing away from and towards the fuselage or slide fore and aft along the fuselage such that the center of lift is moved to be adjacent to the center of gravity.

Adjustment to the center of gravity 15 and/or the center of lift can be pre-programmed prior to use of the drone 100. For example, the dimensions, weight, and sequence of deliveries can be known before loading the packages into the payload carrier 200. The adjustments that are required to maintain a balanced weight, for example, the required angles when swinging the wings, or the location along the fuselage that the wings or remaining packages need to slide to, can be predetermined and programmed into the drone. The adjustments can also be made during use by an operator that controls the drone from a remote location.

The adjustments can also be autonomous and based on readings sent to a processor and controller located on the drone. According to this embodiment, the drone can include a flight computer that can have ideal flight parameters based on the speed of the drone and responsiveness of flight controls. Using an algorithm, the drone will autonomously be able to determine if it is properly balanced and make corrections in order to re-balance the aircraft before, during, or while in flight as is necessary. In this manner, the drone can autonomously make adjustments to the center of gravity and/or adjustments to the center of lift after each package is dropped off or the weight and/or location of the payload changes during use.

The drone 100 can be made from a variety of materials. Non-limiting examples of materials include, metal, metal alloys, hardened plastics, carbon fiber, fiberglass, or combinations thereof. The drone 100 can have a variety of dimensions, for example, the wings can span in a range of 12 inches to 180 inches in width and the fuselage can have a length in the range of 12 to 180 inches. The materials the drone is made from and the dimensions can be selected such that the drone can carry a desired weight of the payload. By way of example, the drone 100 can be designed to be able to carry 15 pounds or more of payload.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention.

As used herein, the words "comprise," "have," "include," and all grammatical variations thereof are each intended to have an open, non-limiting meaning that does not exclude additional elements or steps. While compositions, systems, and methods are described in terms of "comprising," "containing," or "including" various components or steps, the compositions, systems, and methods also can "consist essentially of" or "consist of" the various components and steps. It should also be understood that, as used herein, "first," "second," and "third," are assigned arbitrarily and are merely intended to differentiate between two or more wings, propellers, etc., as the case may be, and does not indicate any sequence. Furthermore, it is to be understood that the mere use of the word "first" does not require that there be any "second," and the mere use of the word "second" does not require that there be any "third," etc.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a–b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A drone comprising:
   a fuselage;
   a first wing extending from a starboard side of the fuselage;
   a second wing extending from a port side of the fuselage;
   a first propeller;
   a second propeller;
   at least three landing rods located adjacent to the first wing, the second wing, or the first and second wings;
   a center of gravity;
   a center of lift,
   wherein the center of gravity is adjustable, the center of lift is adjustable, or the center of gravity and the center of lift are adjustable,
   wherein the first wing and the second wing swing away from or towards the fuselage to adjust the center of lift adjacent to the center of gravity; and
   a payload carrier,
   wherein the drone takes off and lands in a vertical orientation and converts to a horizontal orientation for flight.

2. The drone according to claim 1, wherein the first propeller is affixed to the first wing and the second propeller is affixed to the second wing.

3. The drone according to claim 1, wherein the at least three landing rods extend away from a rear of the fuselage.

4. The drone according to claim 1, wherein at least one of the three or more landing rods is offset from the other landing rods.

5. The drone according to claim 1, wherein at least one component of the drone is configured to re-distribute weight to adjust the center of gravity fore or aft along the fuselage.

6. The drone according to claim 1, further comprising:
   a third propeller;
   a fourth propeller;
   a first vertical connector; and
   a second vertical connector,
   wherein the first and second propellers are affixed to the first vertical connector and the third and fourth propeller are affixed to the second vertical connector, and wherein the first vertical connector is affixed to the first wing and the second vertical connector is affixed to the second wing.

7. The drone according to claim 6, wherein each of the first and second vertical connectors are indirectly connected to the fuselage via an alignment connector rod, and wherein the alignment connector rods are connected at one end and extending a portion into the fuselage, traverse through the interior of the wings, and are connected at the opposite end to the first and second vertical connectors.

8. The drone according to claim 1, wherein the first wing and the second wing are connected to a front of the fuselage via a hinge.

9. The drone according to claim 8, wherein a first angle is created between a trailing edge of the first and second wings and an outside of the fuselage; and a second angle is created between a leading edge of the first and second wings and a front of the fuselage after the first and second wings swing away from the fuselage.

10. The drone according to claim 1, wherein after the wings have swung away from the fuselage, the center of lift moves closer to a front of the fuselage.

11. The drone according to claim 1, wherein payload is not secured within the payload carrier for the duration of use of the drone.

12. The drone according to claim 1, wherein the center of gravity, the center of lift, or the center of gravity and the center of lift are manually adjusted before takeoff.

13. The drone according to claim 1, wherein the center of gravity, the center of lift, or the center of gravity and the center of lift are adjusted at least once after takeoff and during use of the drone.

14. The drone according to claim 1, wherein when the wings have swung towards the fuselage, the center of lift moves closer to a rear of the fuselage.

15. The drone according to claim 1, wherein the fuselage comprises a tail section, and wherein the tail section houses a component selected from the group consisting of a navigational camera, a global positioning system, and combinations thereof.

16. The drone according to claim 1, wherein the payload carrier carries a payload, and wherein the payload is selected from the group consisting of camera equipment, surveying equipment, meteorological equipment, fire control substances for aerial firefighting, business packages, consumer packages, and any combinations thereof.

17. The drone according to claim 1, wherein a payload extends away from a bottom of the fuselage.

18. The drone according to claim 1, wherein the payload carrier is recessed into the fuselage, and wherein a payload is partially or totally protected from environmental conditions.

19. The drone according to claim 1, wherein the drone autonomously adjusts the center of gravity, the center of lift, or both the center of gravity and the center of lift based on changes in weight and location of payload in the payload carrier during use.

* * * * *